(12) United States Patent
Nishizaki et al.

(10) Patent No.: US 7,310,601 B2
(45) Date of Patent: Dec. 18, 2007

(54) SPEECH RECOGNITION APPARATUS AND SPEECH RECOGNITION METHOD

(75) Inventors: Makoto Nishizaki, Nerima-ku (JP); Yoshihisa Nakatoh, Yokohama (JP); Maki Yamada, Kawasaki (JP); Shinichi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/296,268

(22) Filed: Dec. 8, 2005

(65) Prior Publication Data
US 2006/0100876 A1  May 11, 2006

Related U.S. Application Data

(63) Continuation of application No. PCT/JP2005/009652, filed on May 26, 2005.

(30) Foreign Application Priority Data
Jun. 8, 2004  (JP) .............................. 2004-169730

(51) Int. Cl.
*G10L 15/14* (2006.01)
(52) U.S. Cl. ...................... 704/240; 704/255
(58) Field of Classification Search ................ 704/270, 704/236, 240, 231, 255, 250, 239, 257
See application file for complete search history.

(56) References Cited

U.S. PATENT DOCUMENTS 5,467,425 A * 11/1995 Lau et al. .................... 704/243
6,233,559 B1 * 5/2001 Balakrishnan .............. 704/275

(Continued)

FOREIGN PATENT DOCUMENTS

JP  10-198395  7/1998

(Continued)

OTHER PUBLICATIONS

Akio Kobayashi et al., "A Dynamic Adaptation of Language Model for Broadcast News Transcription" (NHK Sci. & Tech. Research Labs.), The Acoustical Society of Japan (ASJ) 2000 Nen Shunki Kenkyu Happyokai Koen Ronbunshu-1-, Mar. 15, 2000, pp. 69-70, with English translation.

*Primary Examiner*—Martin Lerner
(74) *Attorney, Agent, or Firm*—Wenderoth, Lind & Ponack, L.L.P.

(57) ABSTRACT

The present invention provides a speech recognition apparatus which appropriately performs speech recognition by generating, in real time, language models adapted to a new topic even in the case where topics are changed. The speech recognition apparatus includes: a word specification unit for obtaining and specifying a word; a language model information storage unit for storing language models for recognizing speech and corresponding pieces of tag information for each language model; a combination coefficient calculation unit for calculating the weights of the respective language models, as combination coefficients, according to the word obtained by the word specification unit, based on a relevance degree between the word obtained by the word specification unit and the tag information of each language model; a language probability calculation unit for calculating the probabilities of word appearance by combining the respective language models according to the calculated combination coefficients; and a speech recognition unit for recognizing speech by using the calculated probabilities of word appearance.

7 Claims, 14 Drawing Sheets

U.S. PATENT DOCUMENTS

| | | |
|---|---|---|
| 6,418,431 B1 * | 7/2002 | Mahajan et al. ............... 707/4 |
| 6,606,597 B1 * | 8/2003 | Ringger et al. ............. 704/270 |
| 6,778,958 B1 * | 8/2004 | Nishimura et al. ......... 704/235 |
| 7,072,838 B1 * | 7/2006 | Ghosh et al. ............... 704/257 |
| 2001/0021909 A1 * | 9/2001 | Shimomura et al. ........ 704/275 |
| 2002/0087311 A1 * | 7/2002 | Leung Lee et al. ......... 704/251 |
| 2002/0087313 A1 * | 7/2002 | Lee et al. .................... 704/254 |
| 2004/0249628 A1 * | 12/2004 | Chelba et al. ................. 704/4 |
| 2005/0182628 A1 * | 8/2005 | Choi .......................... 704/252 |

FOREIGN PATENT DOCUMENTS

| | | |
|---|---|---|
| JP | 11-7447 | 1/1999 |
| JP | 11-007447 | 1/1999 |
| JP | 2002-297372 | 2/2002 |
| JP | 2002-082690 | 3/2002 |
| JP | 2002-268678 | 9/2002 |
| JP | 2003-036093 | 2/2003 |
| JP | 2003-255985 | 9/2003 |
| JP | 2004-053745 | 2/2004 |
| JP | 2004-333738 | 11/2004 |

\* cited by examiner

FIG. 5

Collocation information 102a

| | | | |
|---|---|---|---|
| Speech recognition | - Techniques | : Individual relevance degree | 0.8 |
| Speech recognition | - Subtitles | : Individual relevance degree | 0.5 |
| " | " | " | |
| " | " | " | |

SPEECH RECOGNITION APPARATUS AND SPEECH RECOGNITION METHOD

CROSS REFERENCE TO RELATED APPLICATION

This is a continuation of PCT Patent Application No. PCT/JP2005/009652, filed on May 26, 2005.

BACKGROUND OF THE INVENTION (1) Field of the Invention

The present invention relates to a speech recognition apparatus and a speech recognition method for recognizing speech by using language models.

(2) Description of the Related Art

Language models which are intended for use in speech recognition and the like are obtained in the following way: preparing a great number of example sentence collections corresponding to target tasks of speech recognition; performing pre-processing, for example, deleting unnecessary symbols and the like from the prepared example sentences; performing a morphological analysis of the pre-processed example sentences; and statistically modeling word concatenation information. In general, 2-gram and 3-gram are used as language models.

Conventionally, the cost of generating language models like this was enormous because a great number of example sentences must be collected in order to execute tasks for which speech recognition is desired to be applied. Therefore, the following has been considered: reducing the number of example sentences which should be collected; and generating language models which are applicable to the topics of an utterance to be recognized (For example, refer to Patent Reference 1 and Patent Reference 2. Patent Reference 1: Japanese Patent Publication No. 2003-36093. Patent Reference 2: Japanese Patent Publication No. 10-198395).

The Patent Reference 1 has disclosed a topic adaptation technique of language models for speech recognition as a method for generating language models such as those described above.

FIG. 1 is a flow chart indicating a speech input search system employing a conventional topic adaptation technique disclosed in Patent Reference 1.

As shown in FIG. 1, in response to a search request uttered by a user, the speech input search system performs speech recognition using acoustic models 1012 and language models 1014 (Step S1016), and generates transcription of the speech (Step S1018). Here, the language models 1014 are generated based on text databases 1020. Next, the speech input search system executes text search using the transcribed search request (Step S1022), and outputs the search results in a predetermined order of relevance degrees (Step S1024). Next, the speech input search system obtains information from the documents of the search results in the descending order of relevance degrees and performs modeling based on the information (Step S1026), and refines the language models 1024 for speech recognition. Additionally, the speech input search system displays the search results on a display unit such as a display screen of a personal computer (Step S1028).

In addition, Patent Reference 2 has disclosed an invention of generating language models of a specified target task using information obtainable from present language models (language models generated from text data of other tasks) instead of collecting a great number of text databases.

FIG. 2 is an illustration for indicating the processing operation performed by the language model generation unit of the speech recognition apparatus in Patent Reference 2.

This language model generation unit calculates language probabilities (probabilities of word appearance) by using a distribution of concatenation frequencies (a posterior knowledge) and concatenation frequencies (a priori knowledge). The former is obtainable from language models (language models generated from the text data of other tasks), and the latter is obtainable from the collection of example sentences (Patent Reference 2, page 11, column 19, lines 3 to 5) containing thousands of words related to a specified target task (the text data of the specified task). In other words, the language model generation unit generates language models corresponding to a specified task. After that, the speech recognition apparatus of Patent Reference 2 performs speech recognition using the language models generated by this language model generation unit.

SUMMARY OF THE INVENTION

The following considers a case of generating subtitles based on AV (Audio Video) data and performing speech recognition of conversation (for example, a case of recognizing conversation while viewing data such as websites, a television program, and an electronic program guide). In this case, there is a feature that topics are sequentially changed in the conversation. However, the techniques of Patent Reference 1 and Patent Reference 2 entail a problem in that language models cannot be adapted to a new topic in real time when topics are changed, and thus speech recognition cannot be appropriately performed.

In order to generate language models of a new topic, the technique disclosed in Patent Reference 1 requires the following processing: performing an information search using recognition results; and performing a morphological analysis of the search results. In other words, in order to refine the present language models and adapt them to a new topic, the technique requires a great number of recognition results and performing a complex processing on the results. Therefore, it is difficult to adapt the language models in real-time.

Further, the technique disclosed in Patent Reference 2 is incapable of performing real-time adaptation of language models in response to a topic change because it requires a collection of example sentences containing thousands of words related to a target task.

The present invention has been conceived considering the above-described problems. An object of the present invention is to provide a speech recognition apparatus which performs an appropriate speech recognition by generating, in real time, language models (probabilities of word appearance) corresponding to a new topic and a speech recognition method for performing the same.

In order to achieve the above-described object, the speech recognition apparatus of the present invention, which obtains and recognizes speech, includes: a word obtainment unit which obtains one of the words; a language model storage unit which stores language models for recognizing speech; a tag information storage unit which stores a piece of tag information, which indicates the feature of each language model, for each of the language models; a combination coefficient calculation unit which calculates, as a combination coefficient, the weight of each language model which corresponds to the word obtained by the word obtainment unit, based on the relevance degree between the word obtained by the word obtainment unit and one of the pieces of tag information of each language model; a probability calculation unit which calculates the probability that a predetermined word will appear in the speech, by using, in combination, the respective language models according to the combination coefficient calculated by the combination coefficient calculation unit; and a recognition unit which recognizes the speech by using the probability calculated by the probability calculation unit.

In this way, in an example case where topics of a user's utterance are changed, the word corresponding to a new topic is obtained and combination coefficients of the respective language models adapted to the new topic are calculated. Combining the respective language models using the calculated combination coefficients makes it possible to calculate, in real time, probabilities (probabilities of word appearance) of a word(s) corresponding to the topic, without collecting a great number of example sentences and performing a complex language processing. In other words, it is possible to generate, in real time, virtual language models adapted to a new topic even in the case where topics are changed, and thus it becomes possible to perform speech recognition appropriately. Further, combination coefficients are calculated based on the relevance degrees between words corresponding to the topic and pieces of tag information of the respective words, and thus it becomes possible to generate language models which are appropriate for the topic.

In addition, the word obtainment unit may obtain the one of the words adapted to the speech recognized by the recognition unit.

In this way, the words adapted to the recognized speech indicate the topics of a user's utterance. Therefore, even in the case where topics of a user's speech are changed, it is possible to generate, in real time each time topics are changed, the language models adapted to the new topic, and thus a user's utterance can be recognized appropriately.

In addition, the speech recognition apparatus may further include: a relevance degree holding unit which holds the relevance degree between each piece of tag information and each of words; a relevance degree derivation unit which derives the relevance degree between each piece of tag information and the word obtained by the word obtainment unit, from the respective relevance degrees held by the relevance degree holding unit; and a importance degree holding unit which holds the importance degree of each piece of tag information to the corresponding one of the language models. The combination coefficient calculation unit may calculate the combination coefficient of each language model by using each relevance degree derived by the relevance degree derivation unit and the importance degree held by the importance degree holding unit. The probability calculation unit may calculate the probability by using (a) the specific model probability which indicates the probability that a predetermined word will appear and which is derived for each language model, and (b) the combination coefficient for each language model.

In this way, a topic and the respective language models can be properly associated with each other based on the relevance degrees and the importance degrees, and thus it is possible to calculate combination coefficients of the respective language models to the topic more accurately. In addition, the relevance degrees between the plural words and each piece of tag information are held. This makes it possible to calculate combination coefficients of the respective language models irrespective of words included in the respective language models, and thus it is possible to generate language models adapted to a great number of words which are topics as long as the word is obtained from among the words whose relevance degrees are held.

In addition, the combination coefficient calculation unit may calculate the combination coefficient of each language model, each time a word is obtained by the word obtainment unit.

In this way, it becomes possible to change the combination coefficients of the respective models immediately in response to the change of topics of a user's utterance, and thus it is possible to recognize the uttered speech appropriately even in the case where topics are sequentially changed.

In addition, the combination coefficient calculation unit may calculate the combination coefficient of each language model, each time plural words are obtained by the word obtainment unit.

In this way, it becomes possible to prevent the combination coefficients of the respective language models from being updated a lot more than needed in response to the frequent changes of topics in the utterance of a user, and thus it is possible to recognize the uttered speech appropriately.

In addition, the combination coefficient calculation unit may calculate a weight, as a combination coefficient, of each language model corresponding to the plural words, based on the relevance degree between the plural words obtained by the word obtainment unit and the tag information of each language model.

In this way, it is possible to prevent the combination coefficients of the respective models for each word included in user's utterance from being updated a lot more than needed. Therefore, it is possible to calculate combination coefficients corresponding to all the topics of the speech. As a result, the uttered speech can be recognized appropriately.

In addition, the speech recognition apparatus may further include a keyword extraction unit which extracts a keyword from at least one of the electronic data that a user is browsing and profile information related to the user. In the apparatus, the word obtainment unit may obtain, as the obtained one of the words, the keyword extracted by the keyword extraction unit.

For example, it can be assumed here that the user utters keywords included in an electronic program guide as the topics in the speech in the case where the user is browsing the electronic data of the electronic program guide and websites. Therefore, the obtainment of the keywords as the words makes it possible to generate the language models corresponding to the topic, and thus it becomes possible to perform speech recognition appropriately. Likewise, since a user often utters a topic concerning himself or herself, the obtainment of the keywords included in the profile information makes it possible to generate the language models corresponding to the topics.

Note that the present invention can be realized not only as a speech recognition apparatus as described above but also as a method and a program intended for the apparatus and a recording medium for storing the program.

The speech recognition apparatus of the present invention is capable of calculating, in real time, probabilities (probabilities of word appearance) of words corresponding to a topic without requiring collection of a great number of example sentences and performing a complex language processing. In other words, the speech recognition apparatus is capable of generating, in real time, language models corresponding to a new topic even when topics are changed, and as a result, the speech recognition apparatus can perform an appropriate speech recognition. Further, the speech recognition apparatus can generate language models which are appropriate for the topic because combination coefficients are calculated based on the relevance degree between the words adapted to the topic and tag information of the words.

FURTHER INFORMATION ABOUT TECHNICAL BACKGROUND TO THIS APPLICATION

The disclosure of Japanese Patent Application No. 2004-169730 filed on Jun. 8, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific Embodiment of the invention. In the Drawings:

FIG. 5 is a diagram indicating the details of the collocation information according to the Embodiment;

DETAILED DESCRIPTION OF THE PREFERRED EMBODIMENT

An Embodiment of the present invention will be described below with reference to the drawings.

The speech recognition apparatus in this Embodiment includes a language model generation device, and performs speech recognition based on the probabilities of word appearance as calculated by the language model generation device.

The language model generation device of the speech recognition apparatus in the Embodiment has been conceived by focusing on the feature that a sentence can be represented by a combination of various topics. The language model generation device calculates probabilities of word appearance based on the words indicating various topics so as to generate language models which can cover arbitrary topics by combining language models which have been previously prepared. Here, the following example sentence will be considered: "Speech recognition technique for spoken language has been established, and thus an aurally handicapped people's desire that all broadcasting programs be provided with subtitles has been realized". It can be said that this sentence is made up of topics concerning "speech recognition", "aural handicap" and "broadcasting". Consequently, in this case, the language model generation device specifies words of "speech recognition", "aural handicap" and "broadcasting", and combines previously prepared language models based on the words so as to obtain collocation probabilities of arbitrary words (probabilities of word appearance).

In other words, the speech recognition apparatus in this Embodiment calculates the probabilities of appearance of words corresponding to a new topic when topics are changed by updating coefficients (combination coefficients) for combining present language models with each other in sequence or in real time, depending on the specified words. In other words, the speech recognition apparatus performs an appropriate recognition of the inputted speech by generating virtual language models which have been adapted to a new topic.

Figure 1:
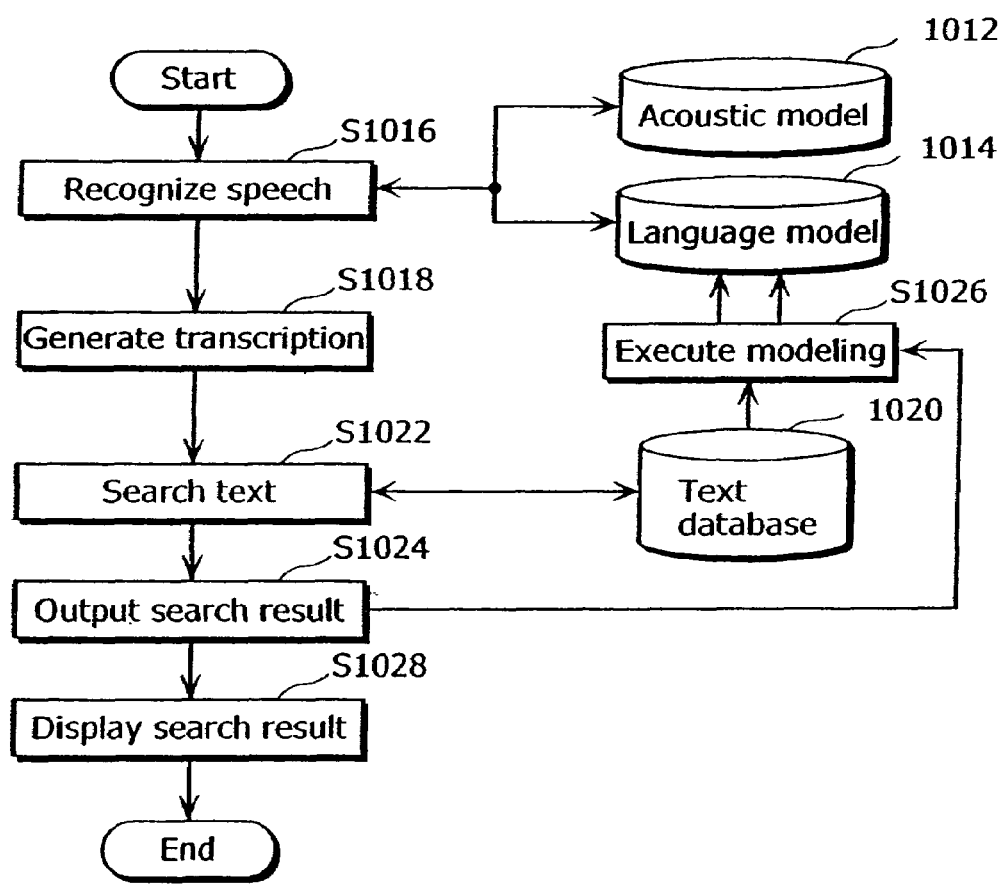
FIG. 1 is a flow chart indicating the operation of a conventional speech input search system.
Figure 2:
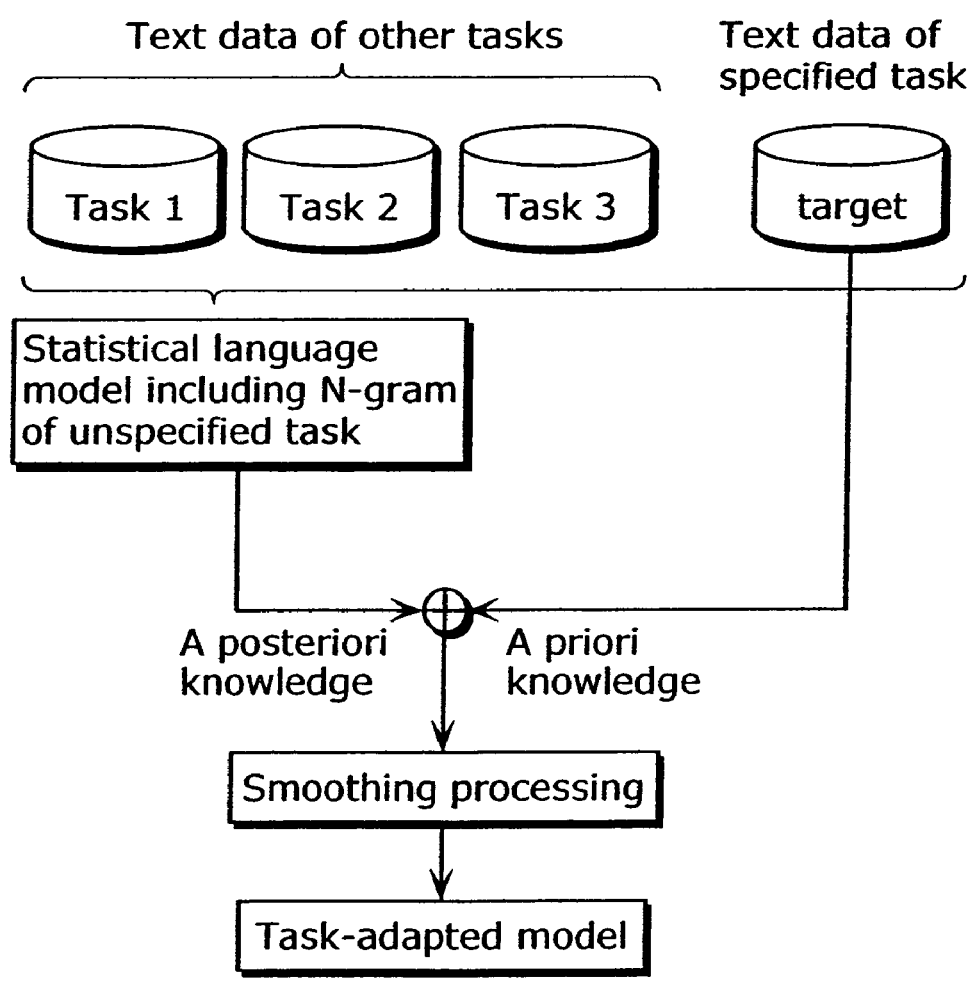
FIG. 2 is an illustration for indicating the processing operation performed by the language model generation unit of a conventional speech recognition apparatus.
Figure 3:
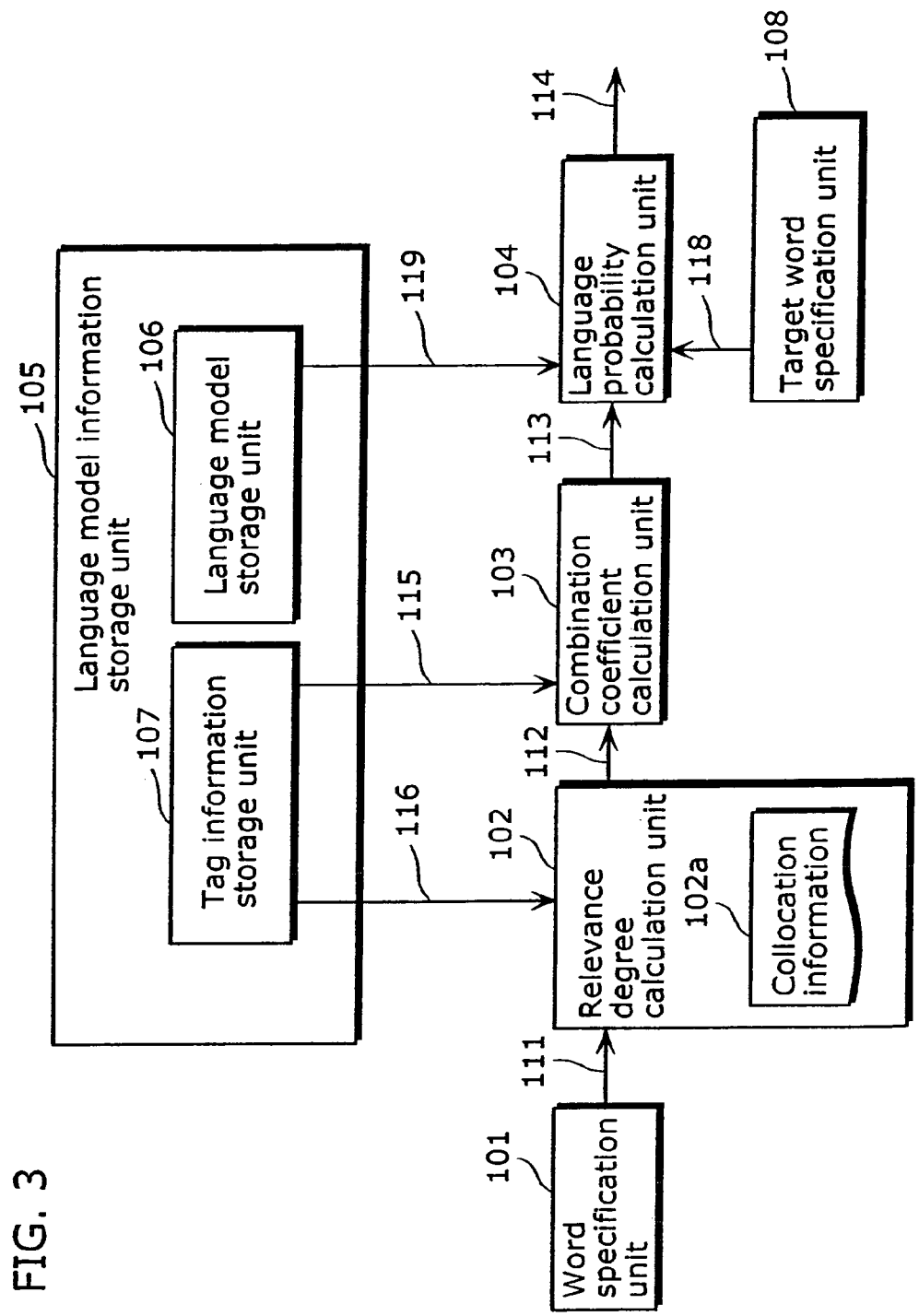
FIG. 3 is a diagram showing the structure of the language model generation device of the speech recognition apparatus according to the Embodiment of the present invention.

FIG. 3 is a diagram showing the structure of the language model generation device according to a first Embodiment of the present invention.

This language model generation device receives one or more words, and calculates a probability of appearance of the next word by combining one or more previously prepared language models according to the received words. This enables an appropriate recognition of an utterance related to the received words to be performed.

The language model generation device of this Embodiment includes: a word specification unit 101; a relevance degree calculation unit 102; a combination coefficient calculation unit 103; a language probability calculation unit 104; a language model information storage unit 105; and a target word specification unit 108.

The language model storage unit 105 includes: a language model storage unit 106 which stores language models; and a tag information storage unit 107 which stores a word indicating a topic feature of each language model (hereinafter referred to as tag information).

Figure 4:
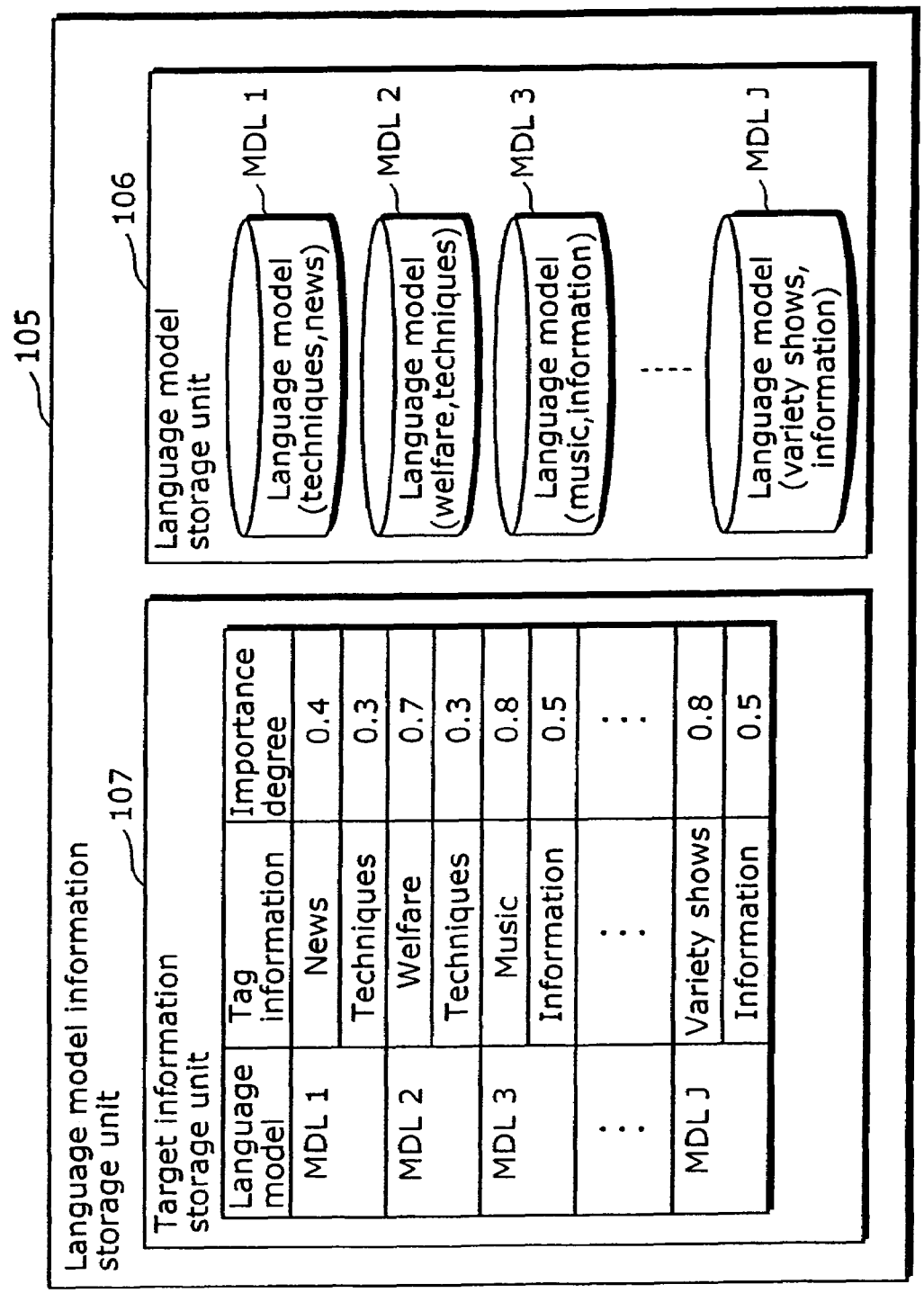
FIG. 4 is a diagram indicating the information stored in the language model storage unit and the tag information storage unit of the Embodiment.

FIG. 4 is a diagram indicating information stored in the language model storage unit 106 and the tag information storage unit 107.

The language model storage unit 106 stores language models. For example, the language model storage unit 106 stores: a language model MDL1 corresponding to techniques and news; a language model MDL2 corresponding to welfare and techniques; and a language model MDL3 corresponding to music and information. The language model storage unit 106 outputs a specified model probability signal 119 indicating a probability of word appearance $P(W_j|W_{j-1})$ which corresponds to each language model, to the language probability calculation unit 104. Here, the probability of word appearance $P(W_j|W_{j-1})$ means the probability that Word $W_j$ appears after Word $W_{j-1}$.

The tag information storage unit 107 stores tag information of each of the language models, and the importance degree of the tag information which indicates a feature of the language model. Here, the importance degree indicates the relevance degree between tag information and the corresponding language model, and it is shown by a number below 1. For example, the language model MDL1 stores: tag information "news" and tag information "techniques"; the importance degree "0.4" of the tag information "news" and the importance degree "0.3" of the tag information "techniques". In addition, the tag information storage unit 107 outputs tag information signals 116 indicating the tag information to the relevance degree calculation unit 102, and outputs, to the combination coefficient calculation unit 103, importance degree signals 115 indicating the importance degrees of the tag information to the respective language models.

The word specification unit 101 receives a word indicating each topic feature, and outputs a word information signal 111 indicating the word so as to specify the word to the relevance degree calculation unit 102.

The target word specification unit 108 outputs, to the language probability calculation unit 104, the target word signals 118 indicating the target words based on which probabilities of word appearance are to be calculated. The target word specification unit 108 regards several candidate words, which are obtained as the results of speech recognition, as targets of probability calculation, and outputs the target word signals 118 indicating the candidate words.

The relevance degree calculation unit 102 holds collocation information 102a indicating how often two words concurrently appear in a single sentence (an individual relevance degree).

FIG. 5 is a diagram indicating the details of the collocation information 102a.

This collocation information 102a indicates: a pair of words; and the individual relevance degrees between the respective words. For example, the collocation information 102a indicates (a) words of "speech recognition" and "techniques" and (b) the individual relevance degree "0.8" indicating the relevance degree between these words. The same collocation information 102a also indicates (c) words of "speech recognition" and "subtitles" and (d) the individual relevance degree "0.5" indicating the relevance degree between these words.

In addition, the relevance calculation unit 102 specifies the individual relevance degree of tag information corresponding to the respective words which have been specified, by the word specification unit 101, based on the word information signals 111 outputted by the word specification unit 101 and tag information signals 116 outputted by the tag information storage unit 107. Here, the relevance calculation unit 102 refers to the collocation information 102a at the time of specifying the individual relevance degrees. After that, the relevance degree calculation unit 102 specifies the individual relevance degree between the specified word and the tag information by regarding one of the words shown in the collocation information 102a as the tag information. After that, the relevance degree calculation unit 102 calculates the relevance degrees (relevance degrees α) of the respective pieces of tag information corresponding to all the words which have been specified by the word specification unit 101, based on the specified individual relevance degrees, and outputs the tag information relevance degree signals 112 indicating the calculated relevance degrees.

The combination coefficient calculation unit 103 calculates the combination coefficients of the respective language models corresponding to the words received by the word specification unit 101 based on the importance degree signals 115 and tag information relevance degree signals 112. The importance degree signals 115 indicate the importance degrees of the language models stored in the language model storage unit 106. After that, the combination coefficient calculation unit 103 outputs the combination coefficient signals 113 indicating the combination coefficients.

The language probability calculation unit 104 obtains (a) specified model probability signals 119 indicating the probabilities of word appearance $P(W_j|W_j-1)$ of the respective language models stored in the language model storage unit 106, and (b) the respective combination coefficient signals 113 outputted by the combination coefficient calculation unit 103. The language probability calculation unit 104, which has obtained the specified model probability signals 119 and combination coefficient signals 113 of the respective language models, calculates the probability of appearance of a target word adapted to the topic with regard to each of the words indicated by each of the target word signals 118 outputted from the target word specification unit 108, and outputs adaptation language probability signals 114 indicating the probabilities of appearance of the word adapted to the topic.

Figure 6:
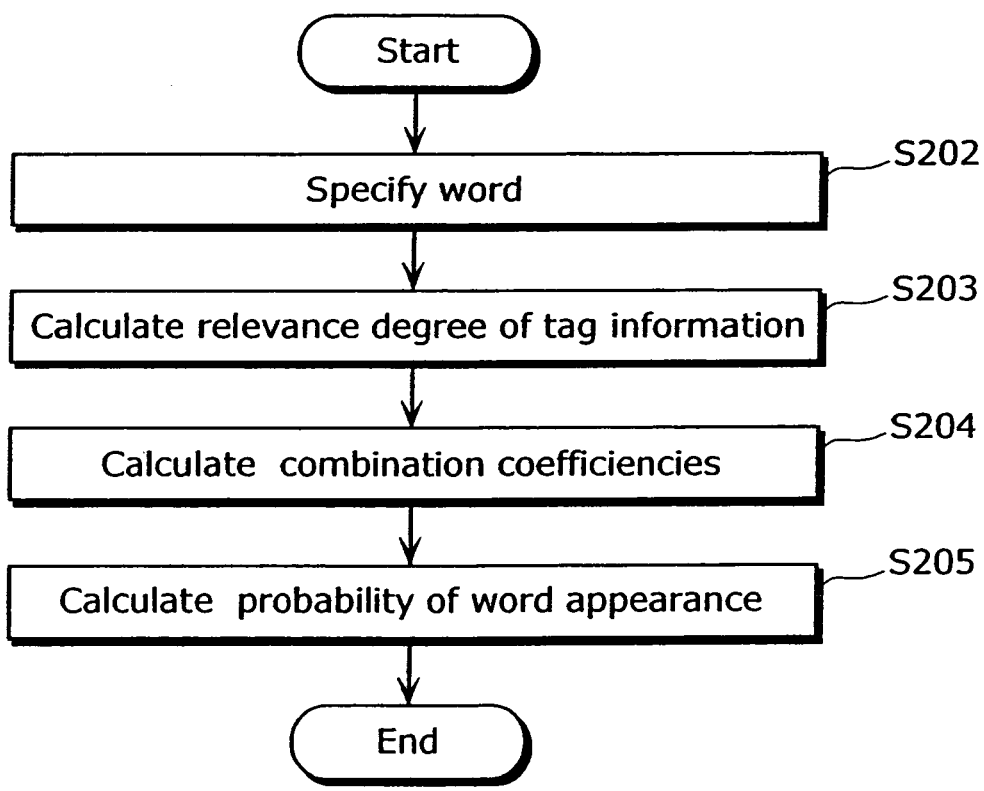
FIG. 6 is a flow chart indicating the operation of generating language models performed by the language model generation unit of the Embodiment.

FIG. 6 is a flow chart indicating the operation of the language model generation device.

First, the word specification unit 101 receives words related to the utterance, such as "speech recognition" and "aural handicap", and specifies the words to the relevance degree calculation unit 102 (Step S202).

After that, the relevance degree calculation unit 102 calculates the relevance degree α of each piece of tag information stored in the tag information storage unit 107 based on the specified words (Step S203).

Here is an example case where there are (a) tag information "news" and tag information "techniques" corresponding to the language model MDL1, and (b) tag information "welfare" and "techniques" corresponding to the language model MDL2. The relevance calculation unit 102 specifies the individual relevance degrees (the relevance degrees of the respective specified words) indicating the degrees of relevance degree between the respective pieces of tag information and the corresponding words. Here, the words are "speech recognition" and "aural handicap" which have been specified by the word specification unit 101, and the respective pieces of tag information correspond to "news", "techniques" and "welfare" stored in the tag information storage unit 107. These individual relevance degrees are specified based on the collocation information 102a.

A key point of the present invention is to calculate combination coefficients of language models by means of tag information based on the received words. Here, a relevance degree a represents the relevance degree between each received word and the tag information, and a topic transition is predicted based on the tag information. For example, the word collocation represents a concurrent appearance tendency of words, and thus includes information related to topic transition like this. For this reason, the relevance degree α can be calculated in the following manner by using the collocation information 102a.

When it is assumed that specified words are $Word_k$ (k=1 to K) and the corresponding pieces of tag information are $TAG_l$ (l=1 to L), the relevance calculation unit 102 calculates each relevance degree α ($TAG_l$) with respect to the $Word_k$ for each $TAG_l$ according to the following Equation 1.

$$\alpha(TAG_1) = \sum_{k=1}^{K} R(Word_k, TAG_1) \quad \text{Equation 1}$$

Here, the function R indicates the individual relevance degree defined by the collocation information 102a, in other words, the individual relevance degree between $Word_k$ and $TAG_l$.

Here, it is possible to define that tag information is represented as a noun included in each language model. However, it is preferable that a word which is unique to each language model be prepared as the tag information. The word is specified by using an indicator such as tfidf (term frequency inverse document frequency).

Additionally, it is preferable that the collocation information 102a be made by using more general information obtained from news paper articles, the Internet and the like. Further, there is a case where the collocation between $Word_k$ and $TAG_l$ has not been defined because of the sparseness of the languages. Considering this, the relevance degree α ($TAG_l$) may be calculated by using the secondary collocational relationship as shown in the following Equation 2.

$$\alpha(TAG_1) = W1 \times \sum_{k=1}^{K} R(Word_k, TAG_1) + \\ (1 - W1) \times \sum_{k=1}^{K}\sum_{m=1}^{M} R(Word_k, Word_m) \times R(Word_m, TAG_1) \quad \text{Equation 2}$$

Here, W1 is a weighting coefficient which represents the correlation between the weight of the first term and the weight of the second term in Equation 2. Additionally, it is possible to use thesaurus information, causal relationship and the like instead of the individual relevance degrees of the function R.

The use of Equation 2 enables calculation of the relevance degree a by assuming that W1=0, even in the case where the individual relevance degree between the specified word ($Word_k$) and the tag information ($TAG_l$) has not been registered in the collocation information 102a, on condition that (a) the individual relevance degree between the specified word ($Word_k$) and word ($Word_m$), and (b) the individual relevance degree between word ($Word_m$) and tag information ($TAG_l$) are registered in the collocation information 102a. For example, as shown in FIG. 5, the relevance degree α of tag information "subtitles" to the specified word "techniques" can be calculated, even in the case where the individual relevance degree between the specified word "techniques" and the tag information "subtitles" has not been registered in the collocation information 102a, on the condition that (a) the individual relevance degree between the specified word "techniques" and a word "speech recognition" and (b) the individual relevance degree between a word "speech recognition" and tag information "subtitles" have been registered in the collocation information 102a.

In other words, the relevance calculation unit 102 calculates the relevance degree α indicating the degrees of importance of the respective pieces of tag information to the words specified by the word specification unit 101. Each piece of tag information indicates the feature of each corresponding language model stored in the language model storage unit 106. A merit of involving tag information is that the number of words specifiable by the word specification unit 101 can be greater than the number of words included in language models. The number of target words available in speech recognition is approximately 100 thousands of words in view of performance. However, the use of the present invention makes it possible to increase the number of words to be specified, for example, up to 100 thousands of words irrespective of the number of words included in the language models, on the condition that there is a collocational relationship between the word to be specified by the word specification unit 101 and the tag information.

Next, the combination coefficient calculation unit 103 calculates the combination coefficient γ of each language model corresponding to the word specified by the word specification unit 101, based on the relevance degree α of the respective pieces of tag information ("news", "welfare", "techniques" and the like) (Step S204). In order to calculate the combination coefficient γ, the degrees of relevance degree between the language models and the respectively corresponding pieces of tag information have been previously defined as importance degrees β in the tag information storage unit 107. For example, it is defined that the importance degree of the tag information "news" to the language model MDL1 is "0.4". The use of this importance degree β makes it possible to calculate a probability of word appearance adapted to the feature of the topic to be identified by the word specified by the word specification unit 101. Note that the above-described tfidf may be used as an indicator of the importance degree as described above.

Here, it is assumed that the n-th language model is N-gram$_n$, and the importance degree between this language model and tag information ($TAG_l$), that is tfidf, is β ($TAG_l$, N-gram$_n$). This defining makes it possible to calculate the combination coefficient $\gamma_n$ to the n-th language model (N-gram$_n$) using the following Equation 3.

$$\gamma_n = \sum_{l=1}^{L} \beta(TAG_1, N - gram_n) \times \alpha(TAG_1) \quad \text{Equation 3}$$

In other words, the combination coefficient calculation unit 103 calculates the combination coefficient γ indicating the weight (the degree of involvement of the specified word in each of the language models) of each combination of the respective language models adapted to the words ("speech recognition" and "aural handicap") which have been specified by the word specification unit 101, based on (a) the tag information relevance signal 112 (relevance degree α) to be outputted from the relevance calculation unit 102, and (b) the importance degree signal 115 (importance degree β) to be outputted from the tag information storage unit 107.

Next, the language probability calculation unit 104 calculates a probability of word appearance by using the following, and outputs the adaptation language probability signal 114: a specified model probability signal 119 indicating the probability of word appearance of each language model stored in the language model storage unit 106; a target word signal 118 indicating the word specified by the target word specification unit 108; and a combination coefficient signal 113 (combination coefficient γ) (Step S205).

In order to calculate the probability of word appearance like as described above, the combination coefficient $\gamma_n$ obtained by using Equation 3 is used. The language probability calculation unit 104 calculates the probability that Word Wj (the word specified by the target word specification unit 108) appears after Word Wj−1, by using Equation 4 below. It is assumed here that a language model is 2-gram for predicting a word based on the word that has appeared immediately before the word to be predicted, but it should be noted that other language models such as arbitrary orders of N-gram (3-gram, 4-gram and the like), class N-gram and FSA (Finite State Automaton) can also be used.

$$P(Wj\,|\,Wj-1) = \sum_{n=1}^{N} \gamma_n \times P_n(Wj\,|\,Wj-1)$$ Equation 4

Here $P_n(Wj|Wj−1)$ indicates the probability of word appearance of the n-th language model.

In this Embodiment as described up to this point, the relevance degree α of each piece of tag information is calculated by the relevance degree calculation unit 102 using Equation 1 or Equation 2 based on the words specified by the word specification unit 101, and the product of (a) the relevance degree α and (b) the importance degree β between each piece of tag information and each language model is calculated by the combination coefficient calculation unit 103 using Equation 3, so as to calculate the combination coefficient γ. Next, the probabilities of word appearance to the words (history and target word) specified by the target word specification unit 108 are calculated by the language probability calculation unit 104 based on the specified model probability signal 119 and combination coefficient signal 113 of each language model according to Equation 4. After that, the calculation result is outputted as the adaptation language probability signal 114.

In other words, the calculation of the probability of word appearance P(Wj|Wj−1) adapted to the topic by the language probability calculation unit 104 enables the following: to find the candidates which are optimum for the inputted speech from among several candidate words to be specified from the target word specification unit 108; and to generate virtual language models adapted to the topic indicated by the specified word.

Figure 7:
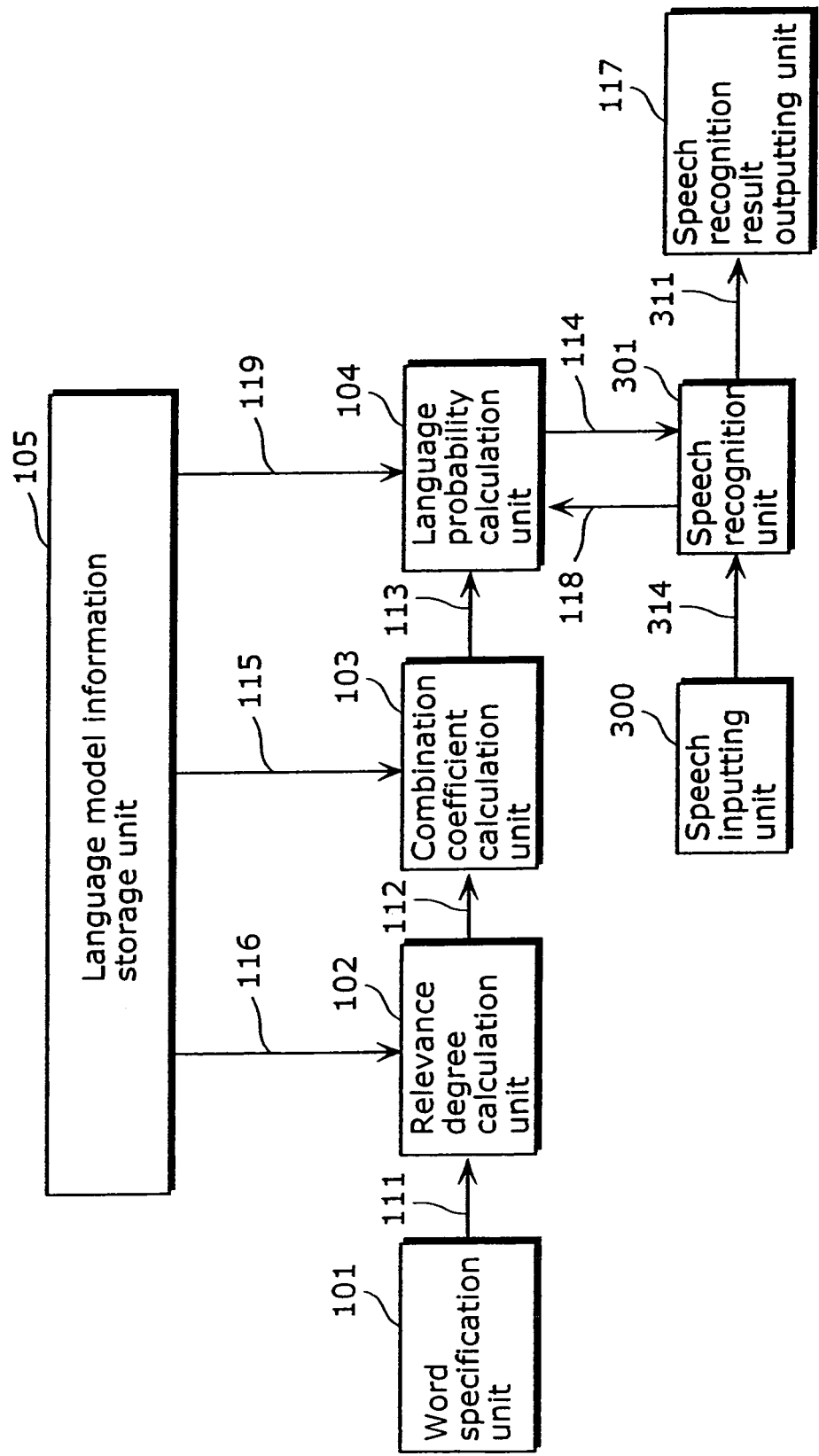
FIG. 7 is a diagram showing the structure of the speech recognition apparatus of the Embodiment.

FIG. 7 is a diagram showing the structure of the speech recognition apparatus in this Embodiment.

The speech recognition apparatus in this Embodiment includes: the language model generation device as described above; a speech inputting unit 300; a speech recognition unit 301; and a speech recognition result outputting unit 117.

The speech inputting unit 300 receives speech (utterance) and outputs the received speech to the speech recognition unit 301 as an inputted speech signal 314.

The speech recognition unit 301 performs speech recognition processing to the inputted speech signal 314. After that, the speech recognition unit 301 outputs, to the language probability calculation unit 104, the target word signal 118 indicating each candidate word corresponding to the speech. Further, the speech recognition unit 301 obtains the adaptation language probability signal 114 indicating the probability of word appearance of each of the candidates calculated by the language probability calculation unit 104, and uses the adaptation language probability signal 114 as a language model. In other words, the speech recognition unit 301 narrows the candidate words down to the words corresponding to the speech based on the probability of word appearance of each candidate. After that, the speech recognition unit 301 outputs speech recognition output signals 311 respectively indicating the words obtained by the narrowing to the speech recognition result outputting unit 117.

The speech recognition result outputting unit 117 is equipped with a display, a device control system and the like, and displays the words shown by the speech recognition output signals 311.

In this Embodiment as described up to this point, only specifying one or more words to the word specification unit 101 enables to cause: the relevance calculation unit 102 to calculate the relevance degree α of each piece of tag information based on the specified words; the combination coefficient calculation unit 103 to calculate the combination coefficient γ of each language model based on the importance degree β between each piece of tag information and each language model; and the language probability calculation unit 104 to calculate the probability of word appearance by combining several language models based on the combination coefficient γ. This makes it possible to use the obtained probabilities of word appearance as the language models adapted to a topic. Consequently, the speech recognition unit 301 can obtain the speech recognition result adapted to the topic instantaneously.

In other words, in this Embodiment, at the time when a user has changed the topics of utterance, the words corresponding to the new topic is obtained and the combination coefficient of each language model corresponding to the topic is calculated. Therefore, combining the respective language models by using the calculated combination coefficient makes it possible to calculate, in real time, the probabilities of word appearance adapted to the topic, without collecting a great number of example sentences or performing a complex language processing. In other words, it is possible to generate, in real time, language models adapted to the new topic even in the case where topics are changed. As a result, it becomes possible to perform speech recognition appropriately. Further, it becomes possible to calculate the combination coefficient which is appropriate to the topic because the combination coefficient is calculated based on the relevance degree between the words adapted to the topic and the tag information.

First Variation

Here, a first Variation of the speech recognition apparatus according to the Embodiment will be described.

Figure 8:
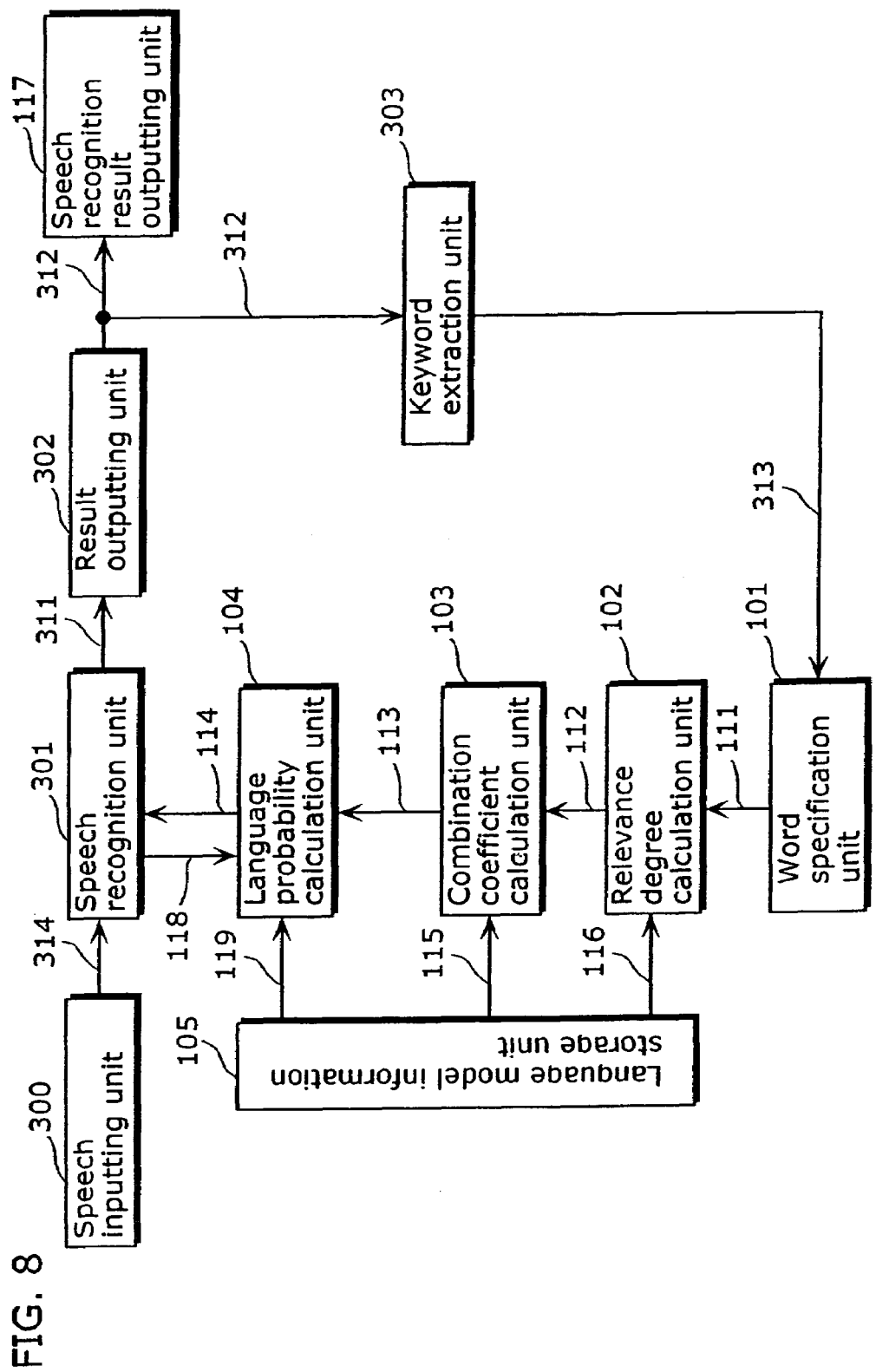
FIG. 8 is a diagram showing the structure of the speech recognition apparatus according to a first Variation of the Embodiment.

FIG. 8 is a diagram showing the structure of the speech recognition apparatus according to this Variation.

The speech recognition apparatus of this Variation reflects the recognition result of the speech recognition unit 301 on the words to be received by the word specification unit 101. For this reason, the sequential update of the combination coefficient γ in response to each feedback of the recognition result makes it possible to perform speech recognition dynamically adapted to a topic. This is because the combination coefficient calculation method of the present invention has a feature in which only specifying a single word makes it possible to structure the language model related to the specified word instantaneously. Thus, the speech recognition apparatus can adapt to the sequential changes of topics instantaneously.

The speech recognition apparatus of this Variation includes the respective structural components shown in FIG. 7, and also includes a result outputting unit 302 and a keyword extraction unit 303.

The result outputting unit 302 receives the speech recognition output signal 311 to be outputted from the speech recognition unit 301, and outputs the speech recognition output signal 311 to the speech recognition result outputting unit 117 and the keyword extraction unit 303 as a recognition result signal 312.

The keyword extraction unit 303 receives the recognition result signal 312 to be outputted from the result outputting unit 302, extracts a word to be a keyword from the recognition result signal 312, and outputs a keyword signal 313 indicating the keyword to the word specification unit 101.

After that, the word specification unit 101 receives a word indicated in the keyword signal 313 to be outputted from the keyword extraction unit 303.

Figure 9:
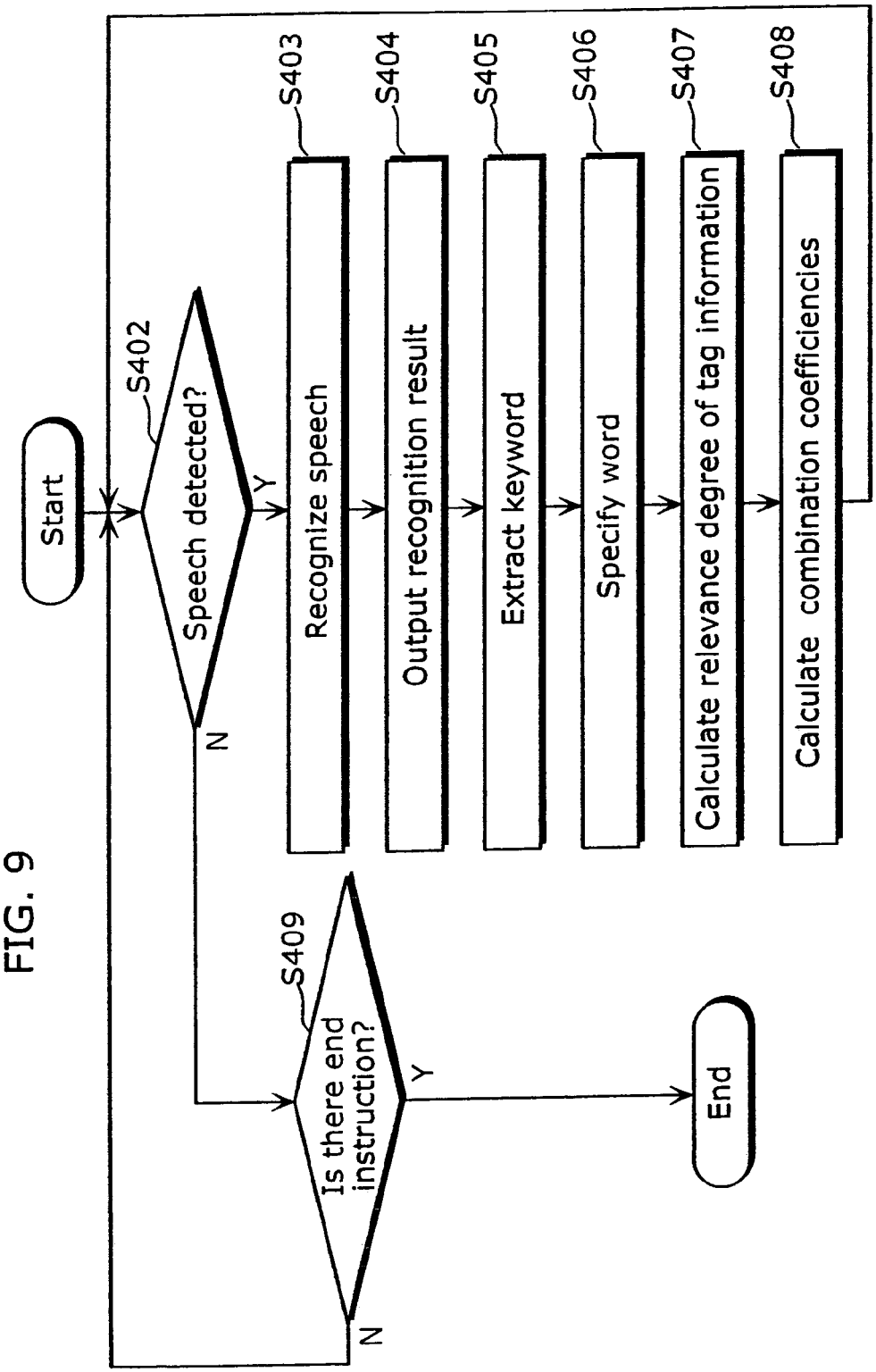
FIG. 9 is a flow chart indicating the operation of the speech recognition apparatus according to the first Variation of the Embodiment.

FIG. 9 is a flow chart indicating the operation of the speech recognition apparatus of this first Variation.

First, the speech recognition unit 301 determines whether or not speech has been detected in the speech inputting unit 300 based on the inputted speech signal 314 to be outputted from the speech inputting unit 300 (Step S402). In the case where the speech recognition unit 301 determines that speech has been detected (Step S402: Y), the speech recognition unit 301 performs recognition of the detected speech (Step S403). In the other case where the speech recognition unit 301 determines that no speech has been detected (Step S402: N), the speech recognition unit 301 determines whether or not there has been an end instruction based on, for example, a user operation (Step S409). After that, the speech recognition unit 301 determines that there has been an end instruction (Step S409: Y), and the speech recognition apparatus completes the whole processing. In the other case where the speech recognition unit 301 determines that there has not been any end instruction (Step S409: N), the speech recognition apparatus repeatedly executes the processing from Step S402.

In response to the recognition of speech in Step S403, the speech recognition result outputting unit 117 obtains the recognition result by the speech recognition unit 301 from the speech recognition unit 301 through the result outputting unit 302, and displays the result on, for example, a display (Step S404). Further, the keyword extraction unit 303 extracts a keyword having information related to the topic based on the recognition result (Step S405), and specifies the extracted keyword to the word specification unit 101. In other words, the word specification unit 101 receives the keyword specified in this way as a word, and specifies the word to the relevance degree calculation unit 102 (Step S406). This keyword extraction unit 303 can extract a keyword by, for example, extracting only nouns from the recognition results. In addition, specifying synonyms and conceptual words of the extracted keywords is effective for eliminating a sparseness problem of a collocational relationship.

Next, the relevance degree calculation unit 102 calculates the relevance degree α of each piece of tag information based on the words specified by the word specification unit 101 (Step S407). Consequently, the combination coefficient calculation unit 103 calculates the combination coefficient γ of each language model by using the relevance degree a and the importance degree β which is a definition provided between each piece of tag information and each language model (Step S408), and uses the calculated combination coefficient γ in the processes of Step S402 and Step S403. In other words, if it is determined again in Step 402 that speech has been detected, the speech recognition unit 301 calculates the probability of word appearance by language models based on the calculated combination coefficient γ using Equation 4, and performs speech recognition by using the probability of word appearance (Step S403).

Performing the above-described operation makes it possible to change the combination coefficient γ of each language model for each utterance (each time a word corresponding to the speech is recognized). Thus, it becomes possible to realize a speech recognition apparatus which is capable of dynamically adapting to a new topic.

As a concrete example, it is assumed that there are language models concerning "techniques and news", "welfare and techniques", "music and information" and "variety shows and information" as shown in FIG. 4. In addition, it is assumed that tag information "news" and tag information "techniques" respectively having importance degrees of 0.4 and 0.3 are stored in the language model "techniques and news". It is also assumed that tag information "welfare" and tag information "techniques" respectively having importance degrees of 0.7 and 0.3 are stored in the language model "welfare and techniques". Further, it is assumed that tag information and its importance degree are stored in each of the other language models as shown in FIG. 4. Additionally, it is assumed that the following speech is inputted at this time: "Speech recognition technique for spoken language has been established, and thus it is expected that an aurally handicapped people's desire of all broadcasting programs being provided with subtitles has been realized. In addition, there has emerged a service of recommending, using subtitles, programs based on keywords which have been previously registered by a user. An example of such a service is the service which enables a person who likes music programs to register keywords of piano, orchestra and the like and to receive mail including the list of corresponding scenes in a program and information of the music players and tune names and the like." Speech recognition based on the present invention is performed in the following way.

First, the speech recognition apparatus equalizes the combination coefficients of all language models. It recognizes "speech recognition" in response to the inputted speech indicating that "Speech recognition technique for spoken language has been established". Since "speech recognition" relates to "techniques", the relevance degree a between tag information "techniques" which is associated with the respective language models MDL1 and MDL2, and tag information "speech recognition" is a great value. It is assumed here that the relevance degree α is 0.8 based on collocation information 102a. Additionally, it is assumed that the importance degree β between the tag information "techniques" and the respective language models MDL1 and MDL2 is 0.3. Consequently, the combination coefficient γ is represented as γ=0.8×0.3=0.24. The speech recognition apparatus performs speech recognition by using the combination coefficient γ and the language models MDL1 and MDL2. As a result, the language model MDL2 related to "welfare and techniques" is also weighted. This makes it possible to be ready for surely recognizing the speech to be inputted next indicating that "It is expected that an aurally handicapped people's desire of all broadcasting programs being provided with subtitles is realized".

Next, when "recommending" is recognized in response to the input of speech indicating that "There has emerged a service of recommending programs based on the keywords which have been previously registered by a user," it is possible to calculate the combination coefficient for the language models MDL3 and MDLJ which are associated with tag information "information". This is because there is a collocation relationship for "information is recommended", between "recognition" and "information". In this way, the next speech input indicating that "An example of such a service is the service which enables a person who likes music programs to register keywords of piano, orchestra and the like and to receive mail including the list of corresponding scenes in a program and information of the music players and tune names and the like in the scenes" can be accurately recognized, by using the language model MDL3 associated with "music and information".

A combination coefficient is updated by using an extracted keyword in this first Variation. However, it is possible to use several keywords including the previously extracted keywords at the time of calculating a combination coefficient. This case is effective for preventing language models from being changed a lot more than needed.

Second Variation

Here, a second Variation of the speech recognition apparatus according to the Embodiment will be described.

Figure 10:
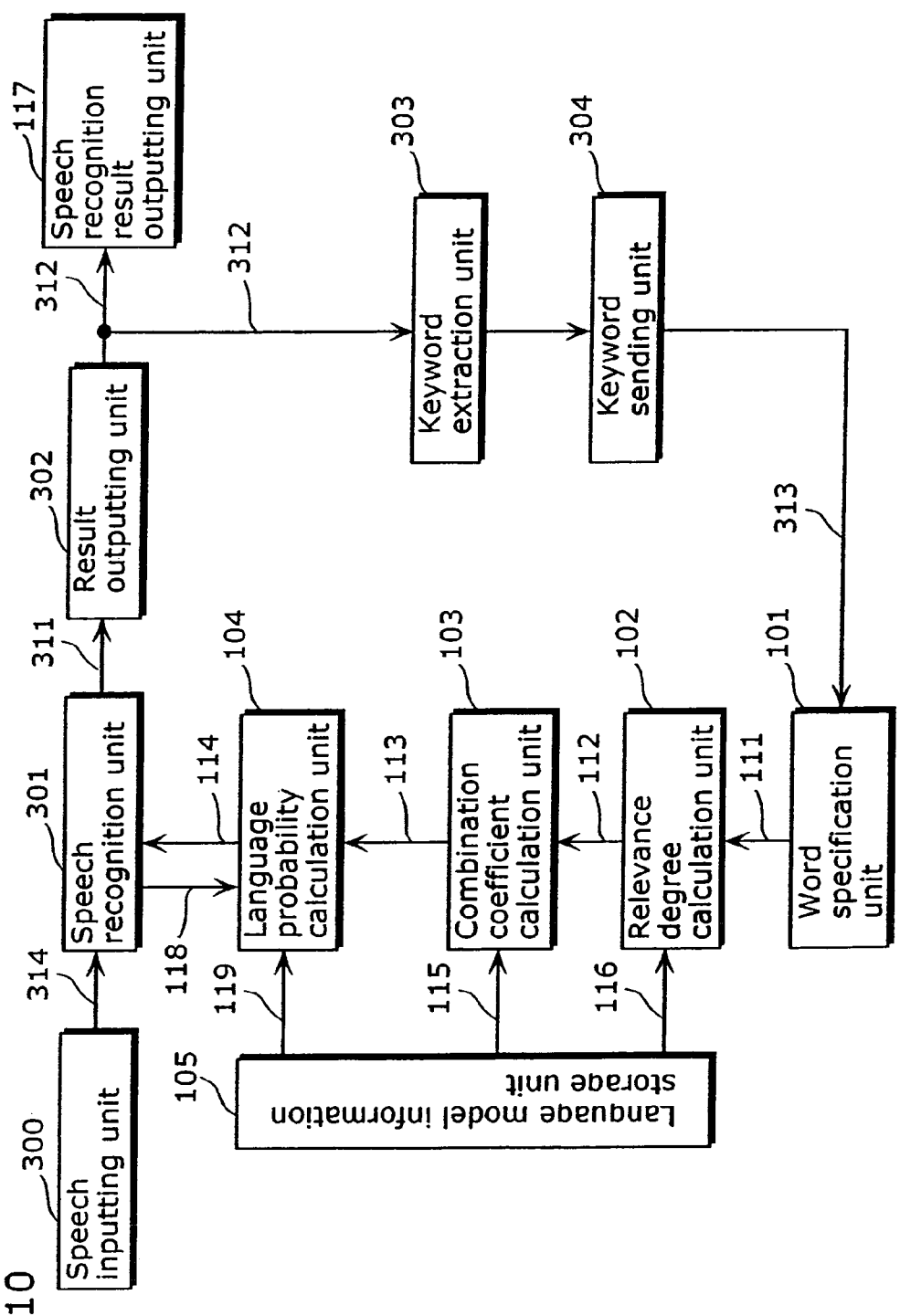
FIG. 10 is a diagram showing the speech recognition apparatus according to a second Variation of the Embodiment.

FIG. 10 is a diagram showing the structure of the speech recognition apparatus according to the second Variation of the Embodiment.

The speech recognition apparatus of this second Variation includes: the respective structural components of the speech recognition apparatus of the first Variation; and a keyword sending unit 304. This keyword sending unit 304 is placed between the keyword extraction unit 303 and the word specification unit 101.

The keyword sending unit 304 obtains a keyword signal 313 from the keyword extraction unit 303 at a predetermined timing, and outputs the keyword signal 313 to the word specification unit 101.

In other words, a combination coefficient $\gamma$ is updated on an utterance-by-utterance basis in the first Variation. In this second Variation, however, it is possible to control the timing of specifying a word to the word specification unit 101. For example, one or more words can be specified at an appropriate timing so that the keyword sending unit 304 sends a keyword signal 313 to the word specification unit 101 for every N times of utterance or after a predetermined number of keywords are accumulated. Here, the one or more words to be specified to the word specification unit 101 by a one-time sending of the keyword signal 313 may correspond to a keyword extracted at the sending timing or several keywords which have been extracted and accumulated by the sending timing.

With this structure, on the condition that the one or more words to be received by the word specification unit 101 correspond to the keywords extracted through speech recognition by the speech recognition unit 301, the feedback of the recognition results is reflected on the speech recognition. Thus, it becomes possible to perform speech recognition which has been dynamically adapted to the topic, and the adaptation to the topic is performed at an appropriate timing.

Third Variation

Here, a third Variation of the speech recognition apparatus according to the Embodiment will be described.

Figure 11:
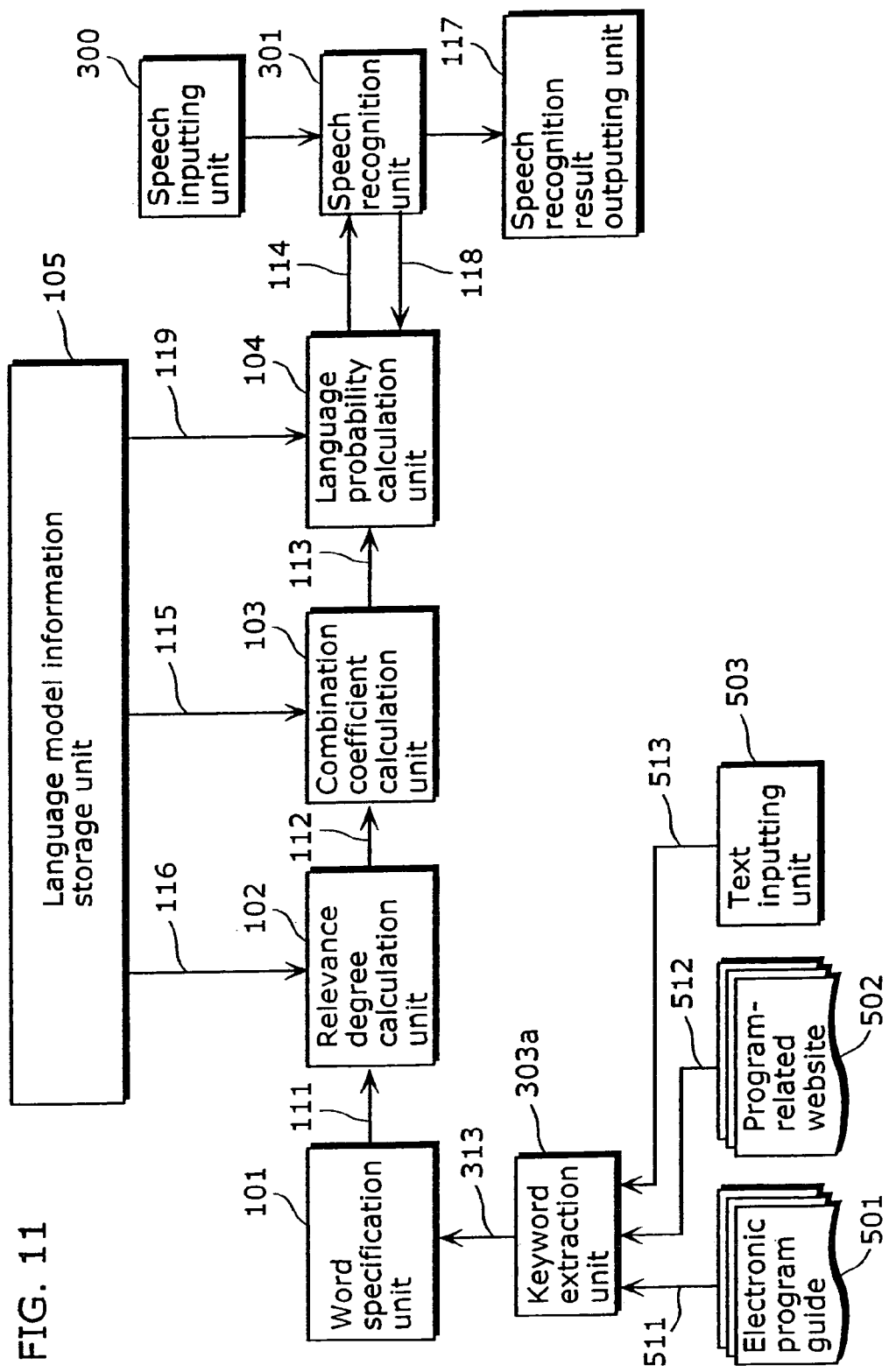
FIG. 11 is a diagram showing the speech recognition apparatus according to a third Variation of the Embodiment.

FIG. 11 is a diagram showing the structure of the speech recognition apparatus according to this third Variation.

The speech recognition apparatus of the third Variation includes: the respective structural components of the speech recognition apparatus of the Embodiment shown in FIG. 7; a keyword extraction unit 303a; and a text inputting unit 503.

The speech recognition apparatus according to the third Variation is structured so that it uses words to be specified to the word specification unit 101 as keywords to be extracted from an electronic program guide 501, a program-related website 502, and text information which will be described later on. With this structure, it becomes possible to perform speech recognition of the details concerning the electronic program guide, a program-related website and an inputted text. In other words, the speech recognition apparatus assumes that the topic relates to the details of the electronic program guide and the like, and performs speech recognition adapted to the topics.

The text inputting unit 503 obtains text information, for example, based on user's input operation through a keyboard. After that, the text inputting unit 503 outputs the text information to the keyword extraction unit 303a as a text input signal 513.

The keyword extraction unit 303a receives the electronic program guide 501 to be distributed electronically in a form of an electronic program guide signal 511, a program-related website 502 which is a website (electronic data) concerning the details of the program in a form of a program-related website signal 512, and a text input signal 513 from the text inputting unit 503. More specifically, the program-related website 502 is electronic data indicating the details of a program which is available through a network, for example, from the website concerning the details of the program listed in the electronic program guide 501 or the website concerning the details of the program described in the website of a TV station. In addition, the details of the electronic program guide 501 and program-related website 502 are updated according to a browsing operation by a user.

After that, the keyword extraction unit 303a extracts a keyword (word) to be specified to the word specification 101 from among the electronic program signal 511, the program-related website signal 512 and the text input signal 513, and outputs the keyword signal 313 indicating the extracted keyword to the word specification unit 101. Here, the keyword extraction unit 303a performs language processing such as a morphological analysis on the electronic program guide signal 511, the program-related website signal 512, and the text input signal 513 which have been received as inputs, and extracts the keyword by using a method of, for example, extracting only nouns. In addition, similar to the case of the first Variation, outputting synonyms and conceptual words of the extracted keyword is effective for solving a sparseness problem of a collocational relationship.

In this way, it is possible to perform speech recognition according to new details, each time a user performs a browsing operation or an inputting operation so as to change (a) the details of the electronic program guide 501 and the program-related websites 502 that the user is browsing, and (b) the details of the text information that the user is inputting. In other words, appropriate speech recognition can be performed by instantaneously generating language models according to the operation by using the feedback in response to the user operation. In this way, it becomes possible to recognize related topics with reference to, for example, the past electronic program guide.

With the structure, it is possible to specify, to the word specification unit 101, the keyword extracted from the electronic program guide, the program-related websites, and the inputted text information, to calculate the probability of word appearance concerning the details of the electronic program guide and the program-related websites and the inputted text information each time the browsed websites are changed, and to perform speech recognition adapted to the topic. Here, the speech recognition apparatus is structured so that it extracts keywords from the electronic program guide, the program-related websites and the inputted text information. However, it should be noted that a keyword may be extracted from only one of them.

For example, the speech recognition apparatus of the third Variation is embedded in a personal computer, and used in a state where users are making conversation while browsing electronic data displayed on the personal computer. More specifically, in the case where users are making conversation while browsing the websites of a cooking program or the like, the agent embedded in the personal computer appropriately recognizes the conversation related to the food being cooked by using the speech recognition apparatus of this third Variation. After that, the agent presents the information indicating the user's interest such as sushi expressed in the conversation based on the recognition results.

Fourth Variation

Here, a forth Variation of the speech recognition apparatus according to the Embodiment will be described.

Figure 12:
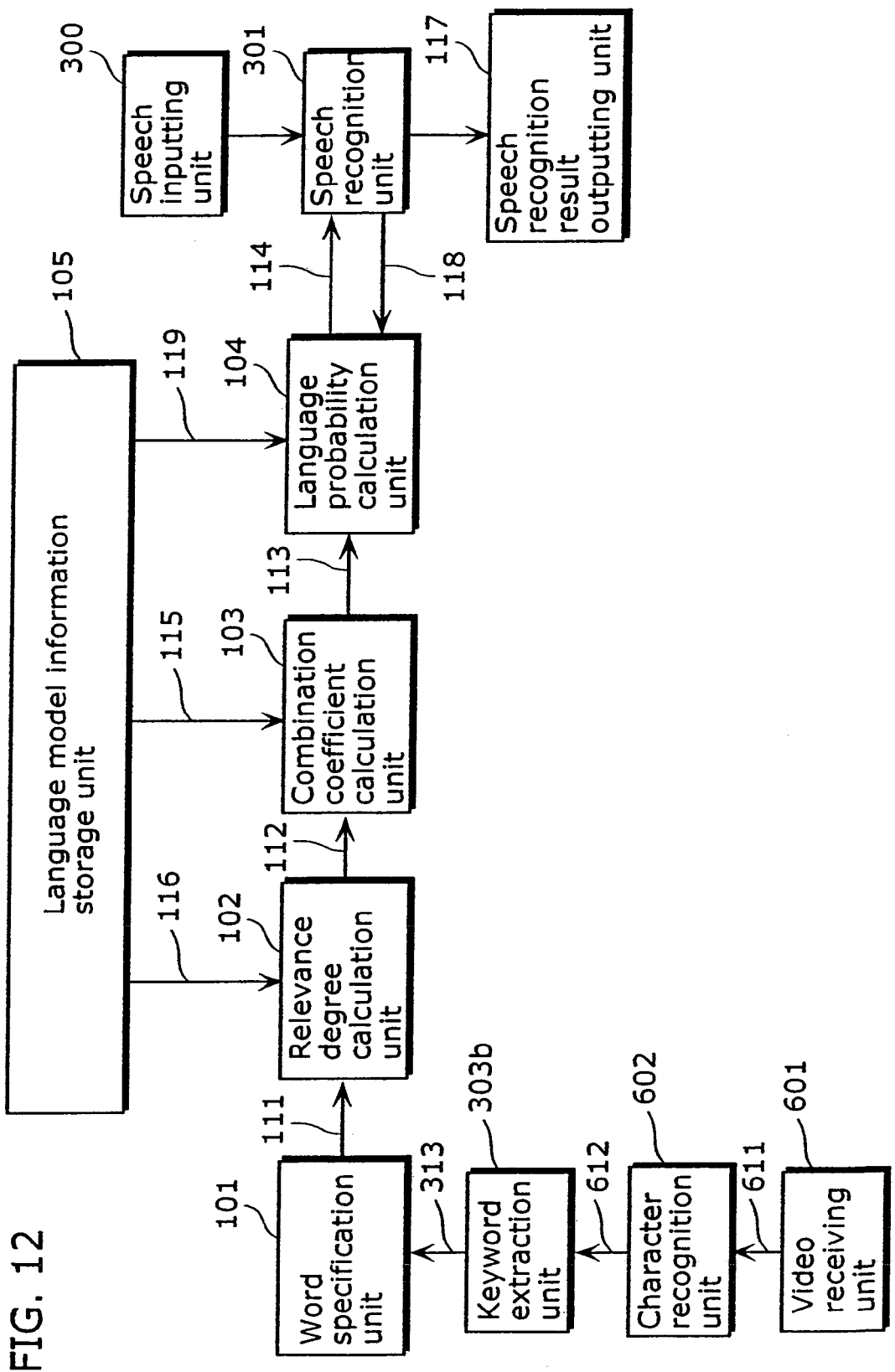
FIG. 12 is a diagram showing the speech recognition apparatus according to a forth Variation of the Embodiment.

FIG. 12 is a diagram showing the structure of the speech recognition apparatus according to this fourth Variation.

The speech recognition apparatus of this fourth Variation includes: the respective structural components of the speech recognition apparatus of the Embodiment shown in FIG. 7; a video receiving unit 601 for showing video, for example, a television; a character recognition unit 602 for performing character recognition in response to the character information to be displayed on the video receiving unit 601; and keyword extraction unit 303b for extracting keywords from the character recognition result signal 612 to be outputted from the character recognition unit 602. This speech recognition apparatus assumes that the details shown by the characters to be displayed on the video receiving unit 601 are the topic target, and performs speech recognition adapted to the topic.

The video receiving unit 601 sends the video information to be displayed to the character recognition unit 602 in a form of a video signal 611. The character recognition unit 602 obtains the video signal 611, and performs character recognition in response to the video information indicated by the video signal 611. After that, the character recognition unit 602 sends the character recognition result to the keyword extraction unit 303b in a form of a character recognition result signal 612. The keyword extraction unit 303b performs processing such as a morphological analysis on the character recognition result signal 612, extracts the keyword (word) from the character recognition result signal 612, and sends the keyword signal 313 indicating the keyword to the word specification unit 101. In this way, the speech recognition apparatus calculates the probability of word appearance concerning the details of the text displayed on the display screen of the video receiving unit 601, and performs speech recognition adapted to the topic.

With the structure, it is possible to perform speech recognition according to the details of this keyword based on the keyword displayed on the display screen of the video receiving unit 601. Therefore, it becomes possible to realize speech recognition according to the details of the news depending on, for example, the title of the news. In addition, the keyword extraction unit 303b can extract a keyword each time a keyword appears as a subtitle so as to recognize the conversation according to the program details.

For example, the speech recognition apparatus of the fourth Variation is embedded in a television and used in a state where users are making conversation while viewing news displayed on the television. More specifically, in an example case where users are making conversation while viewing economic news, the agent embedded in the television appropriately recognizes the conversation related to the news by using the speech recognition apparatus of this fourth Variation. After that, the agent presents the information indicating the user's interests such as stock prices expressed in the conversation based on the recognition results.

Fifth Variation

Here, a fifth Variation of the speech recognition apparatus according to the Embodiment will be described.

Figure 13:
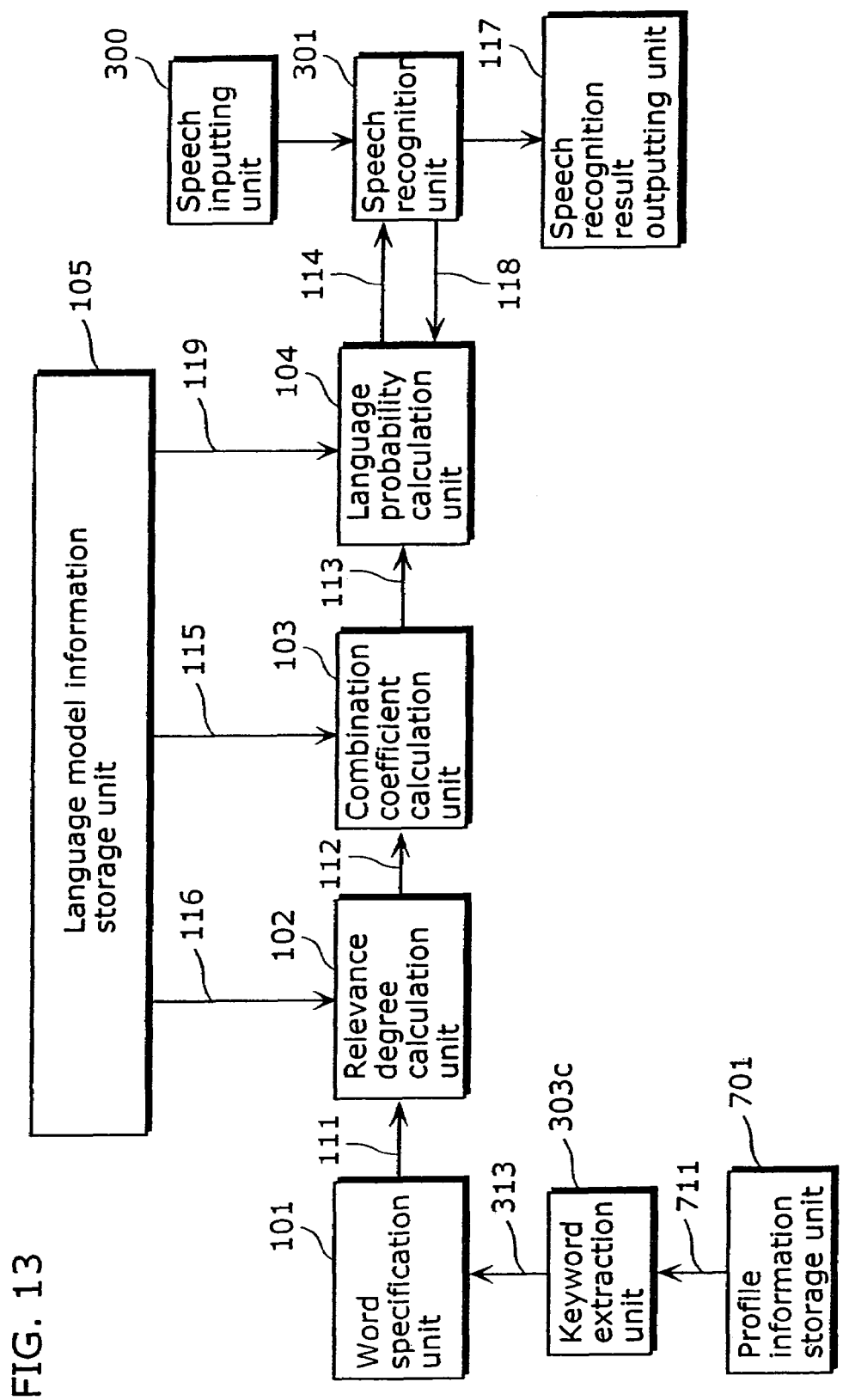
FIG. 13 is a diagram showing the speech recognition apparatus according to a fifth Variation of the Embodiment.

FIG. 13 is a diagram showing the structure of the speech recognition apparatus according to this fifth Variation.

The speech recognition apparatus of this Variation includes: the respective structural components of the speech recognition apparatus of the Embodiment shown in FIG. 7; a profile information storage unit 701 for storing profile information; and a keyword extraction unit 303c for extracting the keyword from a profile information signal 711 to be outputted from the profile information storage unit 701. The profile information relates to the user and includes user's preference. The profile information signal 711 is a signal indicating the profile information. This speech recognition apparatus assumes that the details of the profile information is the topic target, and performs speech recognition adapted to the topic.

In this fifth Variation, the keyword extraction unit 303c performs processing such as a morphological analysis on the profile information signal outputted from the profile information storage unit 701 so as to extract the keyword (word), and the extracted keyword can be specified in a form of keyword signal 313 to the word specification unit 101.

The structure described up to this point makes it possible to realize speech recognition which is adaptable to the topic according to the user profile information. For example, the speech recognition apparatus of this fifth Variation is applied to a ticket reservation system. Here, it is assumed that profile information indicating that "the user likes classical music" has been accumulated in the profile information storage unit 701. In this case, specifying the keyword (which is "classical music" here) indicated by this profile information to the word specification unit 101 makes it possible to generate a language model which covers language expressions that are necessary for reserving a ticket for a classical music concert. In this way, it becomes possible to surely perform speech recognition of a user's utterance.

Sixth Variation

Here, a sixth Variation of the speech recognition apparatus according to the Embodiment will be described.

Figure 14:
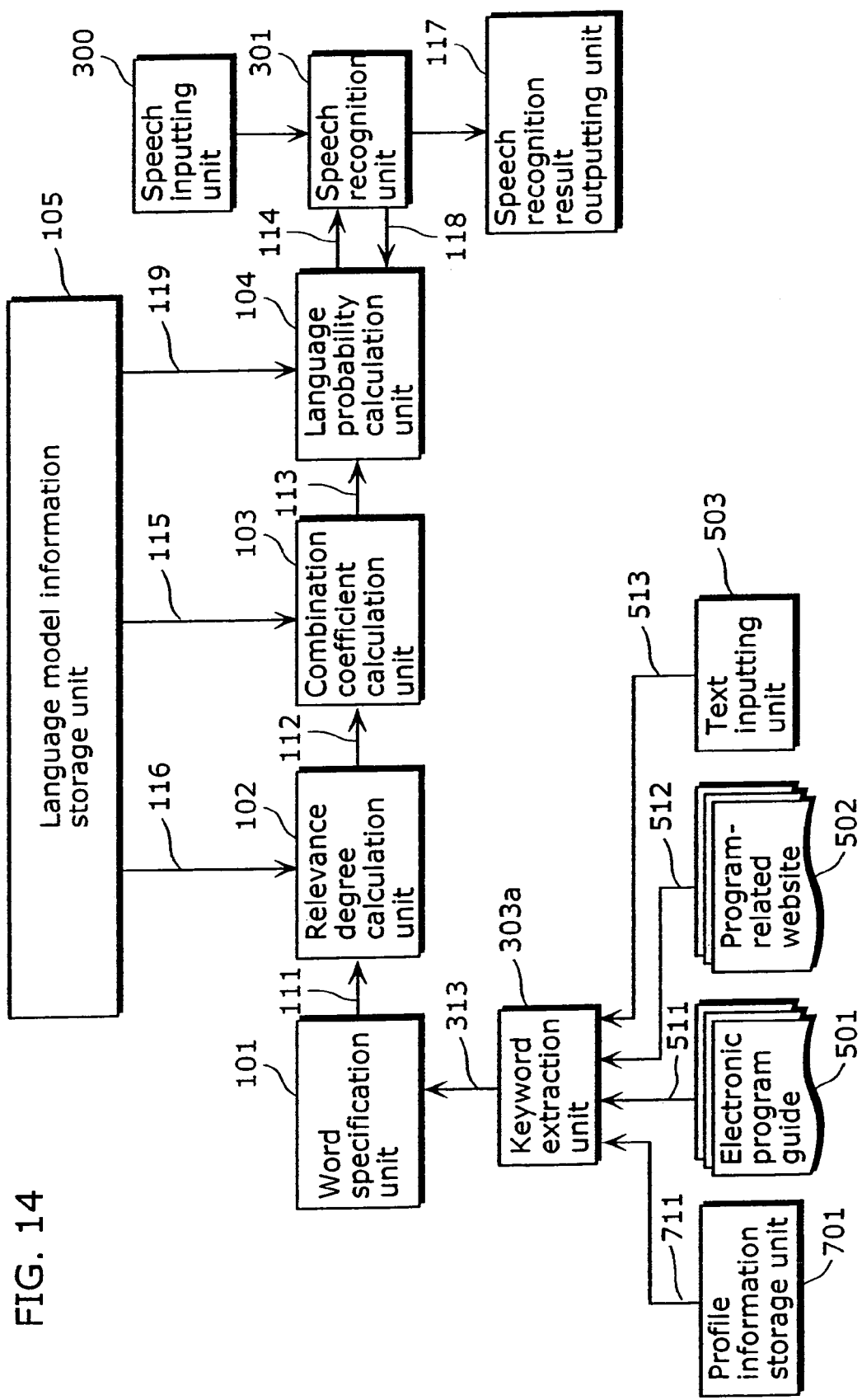
FIG. 14 is a diagram showing the speech recognition apparatus according to the fifth Variation of the Embodiment.

FIG. 14 is a diagram showing the structure of the speech recognition apparatus according to this sixth Variation.

The speech recognition apparatus of this sixth Variation includes: the respective structural components of the speech recognition apparatus of the Embodiment shown in FIG. 7; a text input unit 503 of the third Variation shown in FIG. 11; a profile information storage unit 701 of the fifth Variation shown in FIG. 13; and a keyword extraction unit 303d. This speech recognition apparatus assumes that the profile information and the details of electronic program guide are the topic targets, and performs speech recognition adapted to the topic.

The keyword extraction unit 303d extracts a keyword (word) from the profile information signal 711, the electronic program guide signal 511, the program-related website signal 512, and the text input signal 513, and outputs the keyword signal 313 indicating the keyword to the word specification unit 101.

In other words, the speech recognition apparatus of this sixth Variation has the features of the speech recognition apparatuses of both the third Variation and the fifth Variation, and concurrently uses, in combination, the profile information, the electronic program guide 501, the program-related website 502 and the text information.

In this way, in the case where there is user profile information indicating that "the user likes drama programs", the speech recognition apparatus of this Variation can generate a language model for drama programs based on the user profile information and the electronic program guide.

Although only an exemplary Embodiment of this invention has been described in detail above, those skilled in the art will readily appreciate that many modifications are possible in the exemplary Embodiment without materially departing from the novel teachings and advantages of this invention. Accordingly, all such modifications are intended to be included within the scope of this invention.

INDUSTRIAL APPLICABILITY

The present invention makes it possible to use a language model adapted to a topic, only by specifying a single word indicating the details of the topic. This enables realization of speech recognition dynamically adaptable to the topic. Therefore, the present invention can be applied to the uses (a) as a speech recognition technique for user interface of various kinds of apparatuses such as household electrical appliances, AV (Audio Video) apparatuses and personal computers, and (b) as a subtitle assignment device which converts the AV (Audio Video) data into characters, as a tag assignment device, and the like.

What is claimed is:

1. A speech recognition apparatus which obtains and recognizes speech, said apparatus comprising:
   a language model storage unit operable to store language models for recognizing speech;
   a word obtainment unit operable to obtain one of a plurality of words;
   a specific probability derivation unit operable to derive, for each of the language models, a specific model probability which is a probability that a predetermined word appears next to the word obtained by said word obtainment unit, based on the language model;
   a tag information storage unit operable to store a piece of tag information for each of the language models, the tag information indicating a feature of each language model;
   a relevance degree holding unit operable to hold a relevance degree between each piece of tag information and each of the words;
   an importance degree holding unit operable to hold an importance degree of each piece of tag information to a corresponding one of the language models;
   a relevance degree derivation unit operable to derive the relevance degree between each piece of tag information and the word obtained by said word obtainment unit, from the respective relevance degrees held by said relevance degree holding unit;
   a combination coefficient calculation unit operable to calculate, as a combination coefficient, a weight of each language model which corresponds to the obtained word, based on relevance degrees derived by said relevance degree derivation unit between each piece of tag information and the obtained word, and the importance degrees held by said importance degree holding unit, each of the relevance degrees indicating a relevance degree between the obtained word and one of the pieces of tag information of each language model;
   a probability calculation unit operable to calculate a probability that the predetermined word appears next to the obtained word by calculating, for each of the language models, a product of the specific model probability and the combination coefficient, and by adding the obtained products of the respective language models, the specific model probability corresponding to the language model derived by said specific probability derivation unit, and the combination coefficient corresponding to the language model calculated by said combination coefficient calculation unit; and
   a recognition unit operable to recognize the speech by using the probability calculated by said probability calculation unit,
   wherein said word obtainment unit is operable to obtain the one of the words adapted to the speech recognized by said recognition unit.

2. The speech recognition apparatus according to claim 1, wherein said combination coefficient calculation unit is operable to calculate a combination coefficient of each language model, each time a word is obtained by said word obtainment unit.

3. The speech recognition apparatus according to claim 1, wherein said combination coefficient calculation unit is operable to calculate a combination coefficient of each language model, each time plural words are obtained by said word obtainment unit.

4. The speech recognition apparatus according to claim 1, wherein said combination coefficient calculation unit is operable to calculate a weight, as a combination coefficient, of each language model corresponding to plural words obtained by said word obtainment unit, based on the relevance degree between the plural words obtained by said word obtainment unit and the tag information of each language model.

5. The speech recognition apparatus according to claim 1, further comprising a keyword extraction unit operable to extract a keyword from at least one of electronic data that a user is browsing and profile information related to the user, wherein said word obtainment unit is operable to obtain, as the obtained one of the words, the keyword extracted by said keyword extraction unit.

6. A speech recognition method for obtaining speech and recognizing data stored in a recording medium,
   wherein the recording medium includes:
   a language model storage unit operable to store language models for recognizing speech;
   a tag information storage unit operable to store a piece of tag information for each of the language models, the tag information indicating a feature of each language model;
   a relevance degree holding unit operable to hold a relevance degree between each piece of tag information and each of a plurality of words; and
   an importance degree holding unit operable to hold an importance degree of each piece of tag information to a corresponding one of the language models;
   wherein said speech recognition method comprises:
   obtaining one of the words;
   deriving, for each of the language models, a specific model probability which is a probability that a predetermined word appears next to the word obtained in said obtaining, based on the language model;

deriving the relevance degree between each piece of tag information and the word obtained by said obtaining of the word, from the respective relevance degrees held by the relevance degree holding unit;

calculating, as a combination coefficient, a weight of each language model which corresponds to the obtained word, based on relevance degrees derived by said deriving of the relevance degree between each piece of tag information and the obtained word, and the importance degrees held by the importance degree holding unit, each of the relevance degrees indicating a relevance degree between the obtained word and one of the pieces of tag information of each language model;

calculating a probability that the predetermined word appears next to the obtained word by calculating, for each of the language models, a product of the specific model probability and the combination coefficient, and by adding the obtained products of the respective language models, the specific model probability corresponding to the language model derived in said deriving of the specific model probability, and the combination coefficient corresponding to the language model calculated in said calculating of the weight as the combination coefficient; and recognizing the speech by using the probability calculated in said calculating of the probability, wherein said obtaining of the one of the words includes obtaining the one of the words adapted to the speech recognized in said recognizing of the speech.

7. A program, recorded on a computer-readable recording medium, for causing a computer to obtain speech and recognize the speech by using data stored on the recording medium, wherein the recording medium includes:

a language model storage unit operable to store language models for recognizing speech;

a tag information storage unit operable to store a piece of tag information for each of the language models, the tag information indicating a feature of each language model;

a relevance degree holding unit operable to hold a relevance degree between each piece of tag information and each of a plurality of words; and an importance degree holding unit operable to hold an importance degree of each piece of tag information to a corresponding one of the language models;

wherein said program is for causing a computer to execute operations comprising:

obtaining one of the words;

deriving, for each of the language models, a specific model probability which is a probability that a predetermined word appears next to the word obtained in said obtaining, based on the language model;

deriving the relevance degree between each piece of tag information and the word obtained by said obtaining of the word, from the respective relevance degrees held by the relevance degree holding unit;

calculating, as a combination coefficient, a weight of each language model which corresponds to the obtained word, based on relevance degrees derived by said derivation of the relevance degree between each piece of tag information and the obtained word, and the importance degrees held by the importance degree holding unit, each of the relevance degrees indicating a relevance degree between the obtained word and one of the pieces of tag information of each language model;

calculating a probability that the predetermined word appears next to the obtained word by calculating, for each of the language models, a product of the specific model probability and the combination coefficient, and by adding the obtained products of the respective language models, the specific model probability corresponding to the language model derived in said deriving of the specific model probability, and the combination coefficient corresponding to the language model calculated in said calculating of the weight as the combination coefficient; and recognizing the speech by using the probability calculated in said calculating of the probability; and wherein said obtaining of the one of the words includes obtaining the one of the words adapted to the speech recognized in said recognizing of the speech.

* * * * *